United States Patent
Zhang et al.

(10) Patent No.: US 9,215,662 B2
(45) Date of Patent: Dec. 15, 2015

(54) METHOD, DEVICE, AND SYSTEM FOR CONTROLLING DATA TRANSMISSION POWER OF OPPOSITE TERMINAL

(75) Inventors: Yuan Zhang, Beijing (CN); Bo Xu, Beijing (CN)

(73) Assignee: ST-ERICSSON SEMICONDUCTOR (BEIJING) CO., LTD, Beijing (CN)

( * ) Notice: Subject to any disclaimer, the term of this patent is extended or adjusted under 35 U.S.C. 154(b) by 355 days.

(21) Appl. No.: 13/993,369

(22) PCT Filed: Dec. 21, 2011

(86) PCT No.: PCT/CN2011/084356
§ 371 (c)(1),
(2), (4) Date: Oct. 3, 2013

(87) PCT Pub. No.: WO2012/083851
PCT Pub. Date: Jun. 28, 2012

(65) Prior Publication Data
US 2014/0024409 A1    Jan. 23, 2014

(30) Foreign Application Priority Data
Dec. 23, 2010  (CN) .......................... 2010 1 0620717

(51) Int. Cl.
*H04W 52/12* (2009.01)
*H04W 52/28* (2009.01)

(52) U.S. Cl.
CPC ............ *H04W 52/12* (2013.01); *H04W 52/281* (2013.01); *Y02B 60/50* (2013.01)

(58) Field of Classification Search
CPC . H04W 52/12; H04W 52/281; H04W 52/241; H04W 52/286; H04W 52/04; H04W 52/08; H04W 52/221; H04W 52/24; H04W 52/228; Y02B 60/50; H03G 3/3047
See application file for complete search history.

(56) References Cited

U.S. PATENT DOCUMENTS 6,603,746 B1 * 8/2003 Larijani et al. ................ 370/318
8,031,662 B2 * 10/2011 Lee et al. ...................... 370/329

(Continued)

FOREIGN PATENT DOCUMENTS

CN    1777058 A    5/2006
CN    1777059 A    5/2006

(Continued)

OTHER PUBLICATIONS

International Search Report issued in corresponding International application No. PCT/CN2011/084356, date of mailing Apr. 5, 2012.

(Continued)

*Primary Examiner* — Sujatha Sharma
(74) *Attorney, Agent, or Firm* — Patent Portfolio Builders PLLC

(57) ABSTRACT

The present invention relates to the field of mobile communication and provides a method, a device and a system for controlling data transmission power of an opposite end, so as to reduce power waste during the transmission of special burst data. The method comprises: Step 1: receiving data from an opposite end; Step 2: judging whether the received data is special burst data or service data; Step 3: if the received data is the service data, controlling service data transmission power of the opposite end in accordance with a value of a service data power control parameter; and Step 4: if the received data is the special burst data, controlling special burst data transmission power of the opposite end in accordance with a value of a special burst power control parameter, wherein the value of the special burst data power control parameter is different from the value of the service data control parameter, and the special burst data transmission power of the opposite end is less than the service data transmission power of the opposite end. According to the present invention, it is able to reduce power consumption during the transmission of special burst data.

10 Claims, 5 Drawing Sheets

(56) References Cited

U.S. PATENT DOCUMENTS

2001/0000504 A1* 4/2001 Ishikawa .................... 455/91
2001/0029189 A1* 10/2001 Mandyam .................. 455/522
2004/0102207 A1* 5/2004 Wenzel et al. ............. 455/522
2007/0258403 A1* 11/2007 Hulbert ...................... 370/329
2008/0075027 A1* 3/2008 Lee et al. ................... 370/311

FOREIGN PATENT DOCUMENTS

| CN | 101340215 A | 1/2009 |
|---|---|---|
| CN | 101350639 A | 1/2009 |
| CN | 102076075 A | 5/2011 |
| CN | 102196547 A | 9/2011 |
| WO | 03/034599 A2 | 4/2003 |
| WO | 2010115569 A1 | 10/2010 |

OTHER PUBLICATIONS

Search Report issued by the State Intellectual Property Office of the People's Republic of China in corresponding application No. 2010106207178, Dec. 26, 2012.

* cited by examiner

METHOD, DEVICE, AND SYSTEM FOR CONTROLLING DATA TRANSMISSION POWER OF OPPOSITE TERMINAL

TECHNICAL FIELD

The present invention relates to the field of mobile communication, in particular to a method, a device and a system for controlling data transmission power of an opposite end.

BACKGROUND

In a TD-SCDMA (Time Division-Synchronous Code Division Multiple Access) mobile communication system, closed-loop power control over a signal from a transmitting end includes inner loop power control and outer loop power control.

The inner loop power control is that: a signal receiving end compares a received signal quality with a target value, if the received signal quality is greater than the target value, sends a downward-adjusted power control command, and otherwise sends an upward-adjusted power control command.

The outer loop power control is that: the signal receiving end adjusts a signal quality target value for inner loop power control in accordance with a long-term statistic of a block error rate for the received signal.

In a TD-SCDMA system, when the signal transmitting end has dedicated channel resources but without any data to be transmitted, it is required to send a special burst so as to maintain power control and synchronization of the dedicated channel. The special burst has a timeslot in a structure identical to a service timeslot, merely with fixed data being carried in a data section. Meanwhile, a TFCI domain of the special burst is fixed to 0. The special burst will be periodically transmitted on a minimum code channel with a minimum timeslot of the dedicated code channel resource, and its transmission period is determined by parameters of a network device.

Currently, the power control over the special burst is consistent with that over the data, i.e., the power control over the special burst adopts the same target quality as the service data. However, the special burst is in a fixed data format without carrying any service data. When the special burst is demodulated, the requirement on quality is lower than the data. Hence, if a power control method for the special burst identical to that for the service data is adopted, it will cause power waste.

SUMMARY

An object of the present invention is to provide a method, a device and a system for controlling data transmission power of an opposite end, so as to reduce power consumption during the transmission of special burst data.

In one aspect, the present invention provides a method for controlling data transmission power, comprising the steps of:

Step 1: receiving data from an opposite end;

Step 2: judging whether the received data is special burst data or service data;

Step 3: if the received data is the service data, controlling service data transmission power of the opposite end in accordance with a value of a service data power control parameter; and Step 4: if the received data is the special burst data, controlling special burst data transmission power of the opposite end in accordance with a value of a special burst power control parameter, wherein the value of the special burst data power control parameter is different from the value of the service data control parameter, and the special burst data transmission power of the opposite end is less than the service data transmission power of the opposite end.

The value of the special burst power control parameter is a predetermined value.

When the opposite end is a terminal, a receiving end is a network device, and the value of the special burst power control parameter is a value of an uplink special burst power control parameter, prior to Step 1, the method further comprises:

sending, by the network device, the value of the uplink special burst power control parameter to the terminal, so that the terminal sends the special burst data in accordance with the value of the uplink special burst power control parameter, and Step 4 specifically includes: if the received data is the special burst data, controlling, by the network device, the special burst data transmission power of the terminal in accordance with the value of the uplink special burst power control parameter.

When the opposite end is a network device, the receiving end is a terminal, and the value of the special burst power control parameter is a value of a downlink special burst power control parameter, prior to Step 1, the method further comprises:

receiving, by the terminal, the value of the downlink special burst power control parameter from the network device, and Step 4 specifically includes: if the received data is the special burst data, controlling, by the terminal, the special burst data transmission power of the network device in accordance with the value of the downlink special burst power control parameter.

The value of the uplink special burst power control parameter is equal to or unequal to the value of the downlink special burst power control parameter.

The value of the special burst power control parameter is determined in accordance with the value of the service data power control parameter when the opposite end sends the service data prior to the special burst data.

The value of the special burst power control parameter includes a target value of a signal quality, a target value of a signal bit error rate, and a target value of a signal to noise ratio. The target value of the signal quality of the special burst is less than the target value of the signal quality of the service data, or the target value of the signal to noise ratio of the special burst is less than the target value of the signal to noise ratio of the service data, or the target value of the signal bit error rate of the special burst is greater than the target value of the signal bit error rate of the service data.

In another aspect, the present invention provides a device for controlling data transmission power of an opposite end, the device being a receiving end and comprising:

a receiving unit, configured to receive data from the opposite end;

a judging unit, configured to judge whether the received data is special burst data or service data, thereby to generate a judgment result;

a service controlling unit, configured to, when the judgment result is that the received data is the service data, control the service data transmission power of the opposite end in accordance with a value of a service data power control parameter; and a special burst controlling unit, configured to, when the judgment result is that the received data is the special burst data, control the special burst data transmission power of the opposite end in accordance with a value of a special burst power control parameter, wherein the value of the special burst power control parameter is different from the value of the service data power control parameter, and the special burst data transmission power of the opposite end is less than the service data transmission power of the opposite end.

When the opposite end is a terminal, the receiving end is a network device, and the value of the special burst power control parameter is a value of an uplink special burst power control parameter, the receiving end further comprises:

a sending unit, configured to send the value of the uplink special burst power control parameter to the terminal, so that the terminal sends the special burst data in accordance with the value of the uplink special burst power control parameter, and the special burst controlling unit is specifically configured to, when the judgment result is that the received data is the special burst data, control the special burst data transmission power of the opposite end in accordance with the value of the uplink special burst power control parameter.

When the opposite end is a network device, the receiving end is a terminal, and the value of the special burst power control parameter is a value of a downlink special burst power control parameter, the receiving unit is further configured to receive the value of the downlink special burst power control parameter from the network device, and the special burst controlling unit is specifically configured to, when the judgment result is that the received data is the special burst data, control the special burst data transmission power of the opposite end in accordance with the value of the downlink special burst power control parameter.

In yet another aspect, the present invention provides a system for controlling data transmission power, comprising a transmitting end and a receiving end. The transmitting end is configured to receive data from an opposite end; judge whether the received data is special burst data or service data thereby to generate a judgment result; control service data transmission power of the opposite end in accordance with a value of a service data power control value when the judgment result is that the received data is the service data; and control special burst data transmission power of the opposite end in accordance with a value of a special burst power control parameter when the judgment result is that the received data is the special burst data. The value of the special burst power control parameter is different from the value of the service data power control parameter, and the special burst data transmission power of the opposite end is less than the service data transmission power of the opposite end.

The present application has the following advantageous effect.

In the present invention, different values of the power control parameters are adopted to control the service data transmission and the special burst data transmission respectively. As a result, the power consumption for the special burst data transmission will be reduced.

DETAILED DESCRIPTION

To make the technical problems, the technical solutions and the advantages of the present invention more apparent, the present invention is described hereinafter in details in conjunction with the drawings and the embodiments.

Figure 1:
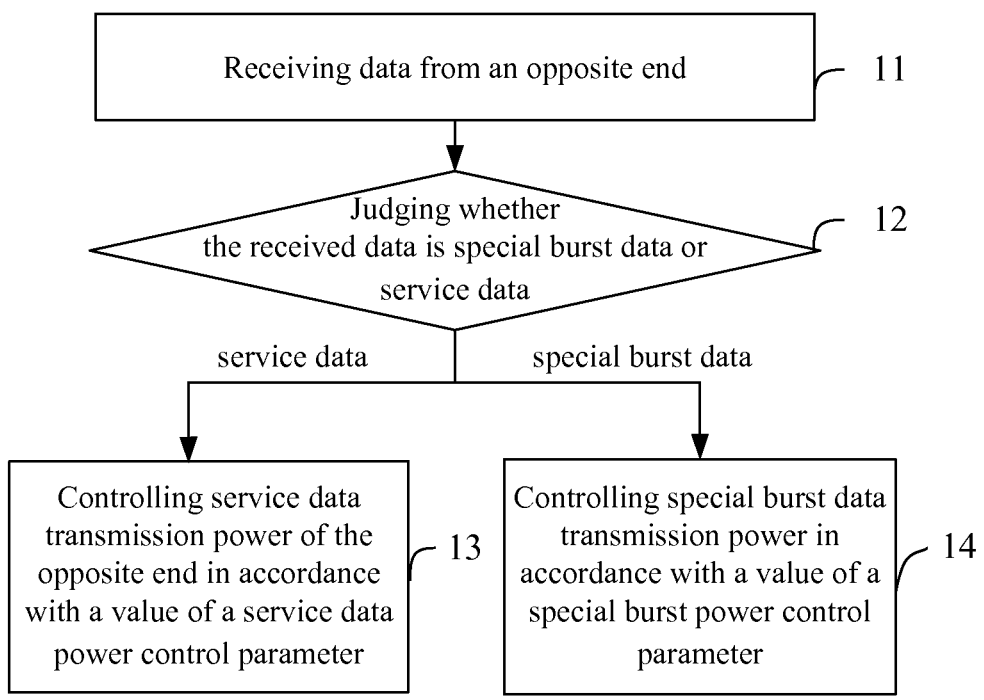
FIG. 1 is a flow chart of a method for controlling data power transmission according to the present invention.

As shown in FIG. 1, the present invention provides a method for controlling data transmission power, comprising the steps of:

Step 11: receiving data from an opposite end;

Step 12: judging whether the received data is special burst data or service data;

Step 13: if the received data is the service data, controlling service data transmission power of the opposite end in accordance with a value of a service data power control parameter; and Step 14: if the received data is the special burst data, controlling special burst data transmission power in accordance with a value of a special burst power control parameter, wherein the value of the special burst power control parameter is different from the value of the service data power control parameter, and the special burst data transmission power of the opposite end is less than the service data transmission power of the opposite end.

In the above solution, different values of the power control parameters are adopted to control the service data transmission and the special burst data transmission respectively. As a result, the power consumption for the special burst data transmission will be reduced.

The control over the special burst data transmission of the opposite end may include inner loop power control and outer loop power control.

Alternatively, the value of the special burst power control parameter is a predetermined value.

The value of the special burst power control parameter is determined in accordance with the value of the service data power control parameter when the service data is transmitted by the opposite end prior to the special burst data. The value of the special burst power control parameter may be a target value of a signal quality, a target value of signal bit error rate or a target value of signal to noise ratio. The target value of signal quality of the special burst is less than the target value of signal quality of the service data, or the target value of signal to noise ratio of the special burst is less than the target value of signal to noise ratio of the service data, or the target value of signal bit error rate of the special burst is greater than the target value of signal bit error rate of the service data.

Figure 2:
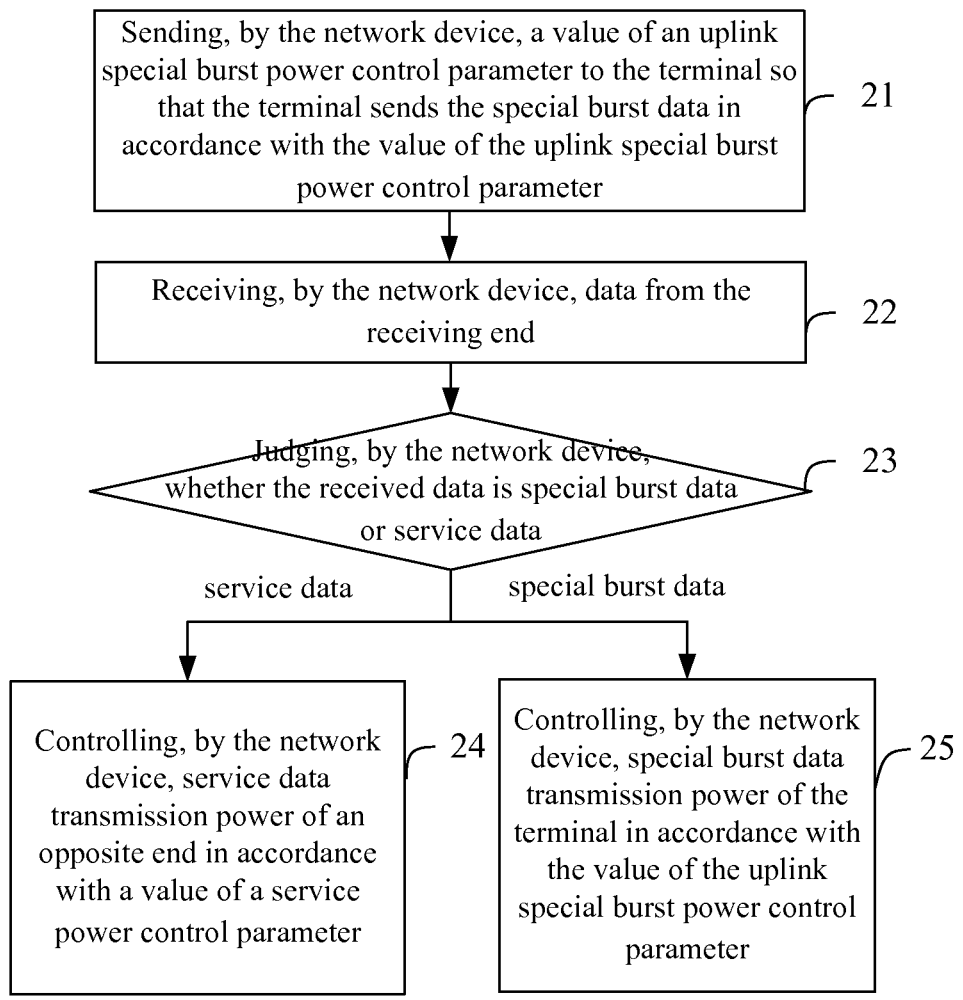
FIG. 2 is a flow chart of a method for controlling data transmission power according to one embodiment of the present invention.

FIG. 2 shows a method for controlling data transmission power according to one embodiment of the present invention. In this embodiment, a transmitting end for the data to be transmitted is a terminal, and a receiving end for the data to be transmitted is a network device. The method comprises the steps of:

Step 21: sending, by the network device, a value of an uplink special burst power control parameter to the terminal so that the terminal sends the special burst data in accordance with the value of the uplink special burst power control parameter;

Step 22: receiving, by the network device, data from the receiving end;

Step 23: judging, by the network device, whether the received data is special burst data or service data;

Step 24: if the received data is the service data, controlling, by the network device, service data transmission power of an opposite end in accordance with a value of a service power control parameter; and Step 25: if the received data is the special burst data, controlling, by the network device, special burst data transmission power of the terminal in accordance with the value of the uplink special burst power control parameter, wherein the value of the special burst power control parameter is different from the value of the service data power control parameter, and the special burst data transmission power of the opposite end is less than the service data transmission power of the opposite end.

The control over the special burst data transmission of the opposite end may include inner loop power control and outer loop power control.

In this embodiment, the value of the uplink special burst power control parameter is sent by the network device to the terminal. The value of the uplink special burst power control parameter is determined in accordance with the value of the uplink service data transmission power parameter when the service data is transmitted by the network device prior to the special burst data. The value of the uplink special burst power control parameter may be a target value of a signal quality, a target value of signal bit error rate and a target value of signal to noise ratio. The target value of signal quality of the uplink special burst is less than the target value of signal quality of the uplink service data, or the target value of signal to noise ratio of the uplink special burst is less than the target value of signal to noise ratio of the uplink service data, or the target value of signal bit error rate of the uplink special burst is greater than the target value of signal bit error rate of the uplink service data.

In another embodiment, the value of the uplink special burst power control parameter is a predetermined value. In other words, predetermined values may be adopted by the terminal and the network device. As a result, the value of the uplink special burst power control parameter is unnecessary to be transmitted from the network device to the terminal in advance.

Figure 3:
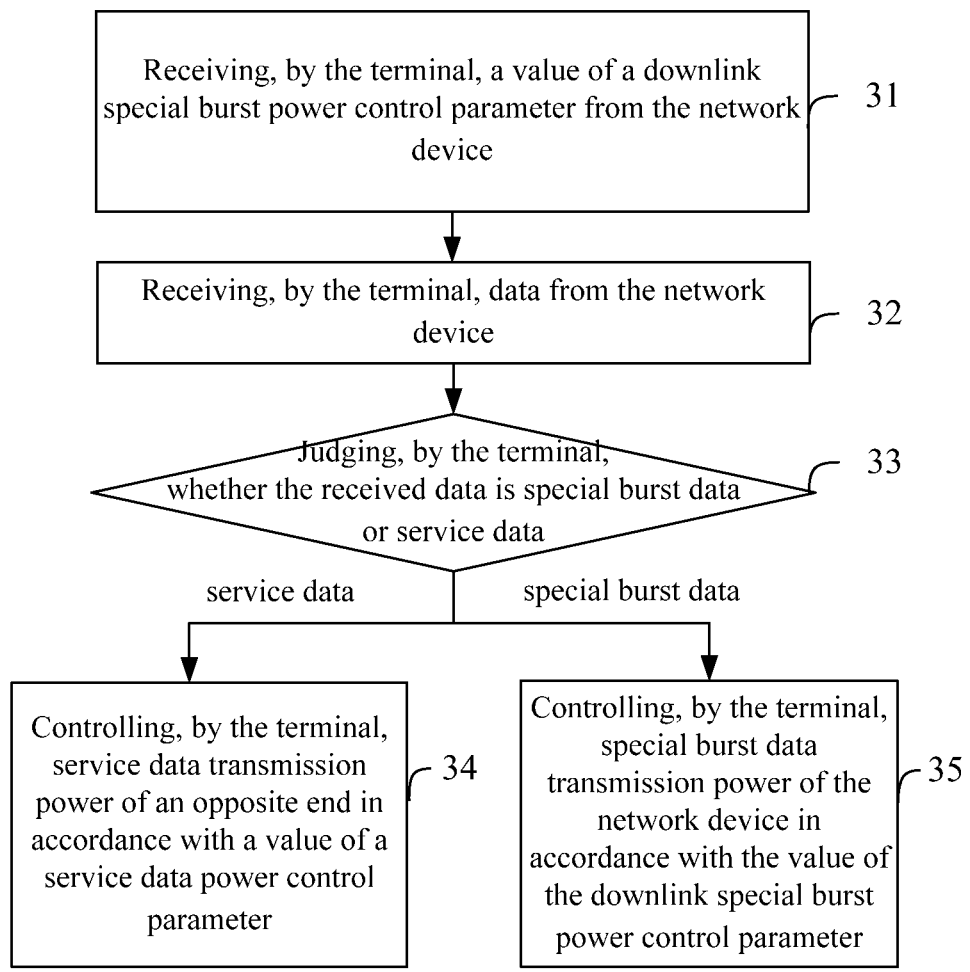
FIG. 3 is a flow chart of a method for controlling data transmission power according to another embodiment of the present invention.

FIG. 3 shows a method for controlling data transmission power according to another embodiment of the present invention. In this embodiment, the transmitting end for the data to be transmitted is a network device, and the receiving end for the data to be transmitted is a terminal. The method comprises the steps of:

Step 31: receiving, by the terminal, a value of a downlink special burst power control parameter from the network device;

Step 32: receiving, by the terminal, data from the network device;

Step 33: judging, by the terminal, whether the received data is special burst data or service data;

Step 34: if the received data is the service data, controlling, by the terminal, service data transmission power of an opposite end in accordance with a value of a service data power control parameter; and Step 35: if the received data is the special burst data, controlling, by the terminal, special burst data transmission power of the network device in accordance with the value of the downlink special burst power control parameter, wherein the value of the special burst power control parameter is different from the value of the service data power control parameter, and the special burst data transmission power of the opposite end is less than the service data transmission power of the opposite end.

The control over the special burst data transmission power of the opposite end may include inner loop power control and outer loop power control.

In this embodiment, the value of the downlink special burst power control parameter is sent by the network device to the terminal. The value of the downlink special burst power control parameter is determined in accordance with the value of the downlink service data transmission power parameter when the service data is transmitted by the network device prior to the special burst data. The value of the downlink special burst power control parameter may be a target value of a signal quality, a target value of signal bit error rate and a target value of signal to noise ratio. The target value of signal quality of the downlink special burst is less than the target value of signal quality of the downlink service data, or the target value of signal to noise ratio of the downlink special burst is less than the target value of signal to noise ratio of the downlink service data, or the target value of signal bit error rate of the downlink special burst is greater than the target value of signal bit error rate of the downlink service data.

In another embodiment, the value of the downlink special burst power control parameter is a predetermined value. In other words, predetermined values may be adopted by the terminal and the network device. As a result, the value of the downlink special burst power control parameter is unnecessary to be transmitted from the network device to the terminal in advance.

Alternatively, the value of the uplink special burst power control parameter is equal or unequal to the value of the downlink special burst power control parameter.

Figure 4:
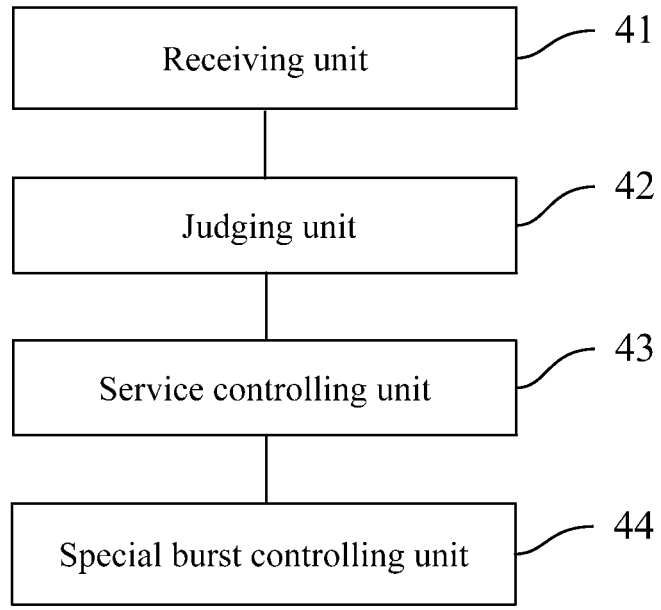
FIG. 4 is a structural schematic view showing a device for controlling data transmission power of an opposite end according to the present invention.

As shown in FIG. 4, the present invention provides a device for controlling data transmission power of an opposite end. The device is a receiving end and comprises:

a receiving unit 41, configured to receive data from the opposite end;

a judging unit 42, configured to judge whether the received data is special burst data or service data;

a service controlling unit 43, configured to, if the judgment result is that the received data is the service data, control service data transmission power of the opposite end in accordance with a value of a service data power control parameter; and a special burst controlling unit 44, configured to, if the judgment result is that the received data is the special burst data, control special burst data transmission power of the opposite end in accordance with a value of a special burst power control parameter, wherein the value of the special burst power control parameter is different from the value of the service data power control parameter, and the special burst data transmission power of the opposite end is less than the service data transmission power of the opposite end.

Figure 5:
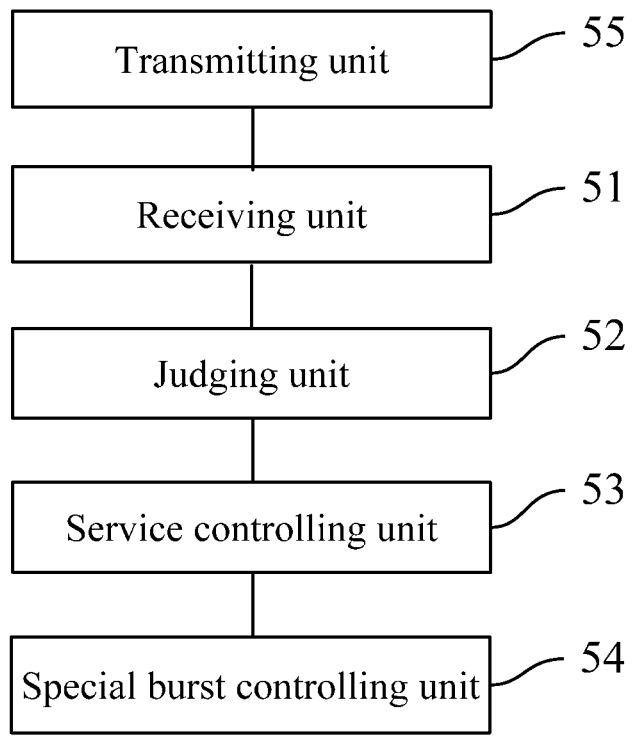
FIG. 5 is a structural schematic view showing a device for controlling data transmission power of an opposite end according to one embodiment of the present invention.

As shown in FIG. 5, when the opposite end is a terminal, the receiving end is a network device, and the value of the special burst power control parameter is a value of an uplink special burst power control parameter, the network device comprises:

a transmitting unit 55, configured to transmit the value of the uplink special burst power control parameter to the terminal so that the terminal transmits the special burst data in accordance with the value of the uplink special burst power control parameter;

a receiving unit 51, configured to receive data from the opposite end;

a judging unit 52, configured to judge whether the received data is special burst data or service data, thereby to generate a judgment result;

a service controlling unit 53, configured to, when the judgment result is that the received data is the service data, control service data transmission power of the opposite end in accordance with a value of a service data power control parameter; and a special burst controlling unit 54, configured to, when the judgment result is that the received data is the special burst data, control special burst data transmission power of the opposite in accordance with the value of the uplink special burst power control parameter, wherein the value of the special burst power control parameter is different from the value of the service data power control parameter, and the special burst data transmission power of the opposite end is less than the service data transmission power of the opposite end.

When the opposite end is a network device, the receiving end is a terminal and the value of the special burst power control parameter is a value of a downlink special burst power control parameter, the terminal comprises:

a receiving unit, configured to receive the value of the downlink special burst power control parameter from the network device and receive data from the opposite end;

a judging unit, configured to judge whether the received data is special burst data or service data, thereby to generate a judgment result;

a service controlling unit, configured to, when the judgment result is that the received data is the service data, control service data transmission power of the opposite end in accordance with a value of a service data power control parameter; and a special burst controlling unit, configured to, when the judgment result is that the received data is the special burst data, control special burst data transmission power of the network device in accordance with the value of the downlink special burst power control parameter, wherein the value of the special burst power control parameter is different from the value of the service data power control parameter, and the special burst data transmission power of the opposite end is less than the service data power transmission of the opposite end.

Figure 6:
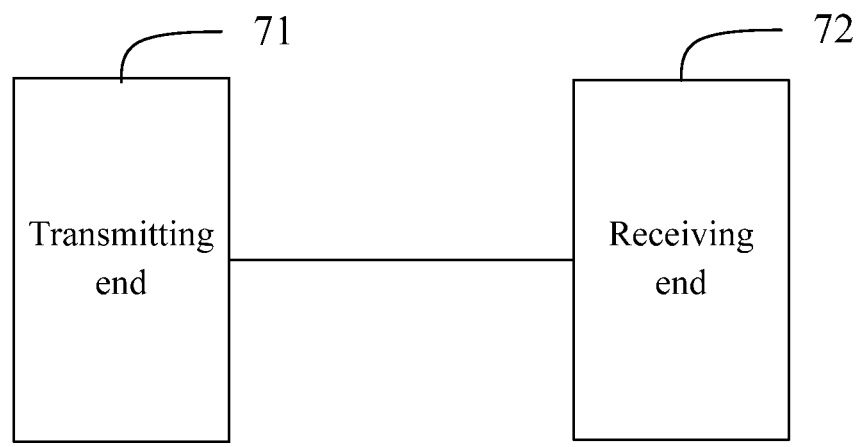
FIG. 6 is a structural schematic view showing a system for controlling data transmission power according to the present invention.

As shown in FIG. 6, the present invention provides a system for controlling data transmission power, comprising a transmitting end 71 and a receiving end 72. The receiving end 72 is configured to receive data from an opposite end; judge whether the received data is special burst data or service data, thereby to generate a judgment result; when the judgment result is that the received data is the service data, control service data transmission power of the opposite end in accordance with a value of a service data power control parameter; and when the judgment result is that the received data is the special burst data, control special burst data transmission power of the opposite end in accordance with a value of a special burst power control parameter. The value of the special burst power control parameter is different from the value of the service data power control parameter, and the special burst data transmission power of the opposite end is less than the service data transmission power of the opposite end.

In this embodiment, the transmitting end 71 is a terminal, and the receiving end 72 is a network device. Alternatively, the transmitting end 71 is a network device, and the receiving end 72 is a terminal In the present invention, the value of the special burst power control parameter may be transmitted to the terminal via the network device, or predetermined in the terminal and the network device respectively.

The present invention provides a method for controlling special burst power in an IDD system such as a TD-SCDMA system. Different values of the power control parameters are adopted for special burst data and service data respectively. As a result, it is able to solve the problem under the existing power control mechanism, i.e., interference of the special burst on the other user signals due to the same value of the power control parameters adopted for the special burst and the service data.

In the present invention, different methods are adopted for power control over the special burst and the service data respectively. In a communication system, due to different communication contents, there are different performance requirements on the service data, and different services require different target block error rates. Therefore, it is required to provide different values of the power control parameters for different services. However, since the transmission mode and the contents of the special burst are fixed, the performance requirements on the special burst are fixed too. As a result, the special burst may adopt different control parameters from the service data, and these parameters are relatively fixed.

The value of the power control parameter may be a target block error rate or a target quality.

Since the value of the special burst power control parameter is relatively fixed, it may adopt a default value, or be determined by the network device and then notified to the terminal via air signaling.

Two application scenarios for the present invention are described hereinafter.

For a downlink signal, i.e., the signal transmitted from the network device to the terminal, the method comprises the following steps:

Step 1: notifying, by the network device, a value of a service data power control parameter and a value of a special burst power control parameter to the terminal in advance respectively, wherein the value of the service data power control parameter may be notified to the terminal via dedicated signaling, while the value of the special burst power control may be a default value, or transmitted via common or dedicated signaling;

Step 2: if the data detected by the terminal is service data, controlling, by the terminal, the power of the downlink signal by using the value of the service data power control parameter; and Step 3: if the data detected by the terminal is special burst, controlling, by the terminal, the power of the special burst by using the value of the special burst power control parameter.

For an uplink signal, i.e., the signal transmitted from the terminal to the network device, the method comprises the following steps:

Step 1: if the data detected by the network device is service data, controlling, by the network device, the power of the uplink signal by using the value of the service data power control parameter; and Step 2: if the data detected by the network device is special burst, controlling, by the network device, the power of the special burst by using the value of the special burst power control parameter, wherein the value of the special burst power control parameter is unequal to the value of the service data power control parameter.

The embodiments for the method correspond to those for the device. For the steps not described detailedly in the embodiments for the method, please refer to the relevant descriptions in the embodiments for the device, and vice versa.

In the embodiments for the method according to the present invention, the order of the steps is not limited to the serial numbers thereof. For a person skilled in the art, any change in the order of the steps shall also fall within the scope of the present invention if without any creative effort.

The above are merely the embodiments of the present invention. It should be noted that, a person skilled in the art may further make improvements and modifications without departing from the principle of the present invention, and these improvements and modifications shall also be considered as the scope of the present invention.

What is claimed is:

1. A method for controlling data transmission power of an opposite end, comprising:
    Step 1: receiving data from an opposite end;
    Step 2: judging whether the received data is special burst data or service data;
    Step 3: if the received data is the service data, controlling service data transmission power of the opposite end in accordance with a value of a service data power control parameter; and
    Step 4: if the received data is the special burst data, controlling special burst data transmission power of the opposite end in accordance with a value of a special burst power control parameter, wherein the value of the special burst data power control parameter is different from the value of the service data control parameter, and the special burst data transmission power of the opposite end is less than the service data transmission power of the opposite end.

2. The method for controlling data transmission power of an opposite end according to claim 1, wherein when the opposite end is a terminal, a receiving end is a network device, and the value of the special burst power control parameter is a value of an uplink special burst power control parameter, prior to Step 1, the method further comprises:
    sending, by the network device, the value of the uplink special burst power control parameter to the terminal, so that the terminal sends the special burst data in accordance with the value of the uplink special burst power control parameter, and
    wherein Step 4 specifically includes: if the received data is the special burst data, controlling, by the network device, the special burst data transmission power of the terminal in accordance with the value of the uplink special burst power control parameter.

3. The method for controlling data transmission power of an opposite end according to claim 1, wherein when the opposite end is a network device, the receiving end is a terminal, and the value of the special burst power control parameter is a value of a downlink special burst power control parameter, prior to Step 1, the method further comprises:
    receiving, by the terminal, the value of the downlink special burst power control parameter from the network device, and
    wherein Step 4 specifically includes: if the received data is the special burst data, controlling, by the terminal, the special burst data transmission power of the network device in accordance with the value of the downlink special burst power control parameter.

4. The method for controlling data transmission power of an opposite end according to claim 1, wherein the value of the special burst power control parameter is a predetermined value.

5. The method for controlling data transmission power of an opposite end according to claim 1, wherein the value of the special burst power control parameter is determined in accordance with the value of the service data power control parameter when the opposite end sends the service data prior to the special burst data.

6. The method for controlling data transmission power of an opposite end according to claim 1, wherein the value of the special burst power control parameter includes a target value of a signal quality, a target value of a signal bit error rate, and a target value of a signal to noise ratio, wherein
    the target value of the signal quality of the special burst is less than the target value of the signal quality of the service data, or
    the target value of the signal to noise ratio of the special burst is less than the target value of the signal to noise ratio of the service data, or
    the target value of the signal bit error rate of the special burst is greater than the target value of the signal bit error rate of the service data.

7. A device for controlling data transmission power of an opposite end, the device being a receiving end and comprising:
    a receiving unit, configured to receive data from the opposite end;
    a judging unit, configured to judge whether the received data is special burst data or service data, thereby to generate a judgment result;
    a service controlling unit, configured to, when the judgment result is that the received data is the service data, control the service data transmission power of the opposite end in accordance with a value of a service data power control parameter; and
    a special burst controlling unit, configured to, when the judgment result is that the received data is the special burst data, control the special burst data transmission power of the opposite end in accordance with a value of a special burst power control parameter, wherein the value of the special burst power control parameter is different from the value of the service data power control parameter, and the special burst data transmission power of the opposite end is less than the service data transmission power of the opposite end.

8. The device for controlling data transmission power of an opposite en according to claim 7, wherein when the opposite end is a terminal, the receiving end is a network device, and the value of the special burst power control parameter is a value of an uplink special burst power control parameter, the receiving end further comprises:
    a sending unit, configured to send the value of the uplink special burst power control parameter to the terminal, so that the terminal sends the special burst data in accordance with the value of the uplink special burst power control parameter, and
    wherein the special burst controlling unit is specifically configured to, when the judgment result is that the received data is the special burst data, control the special burst data transmission power of the opposite end in accordance with the value of the uplink special burst power control parameter.

9. The device for controlling data transmission power of an opposite en according to claim 7, wherein when the opposite end is a network device, the receiving end is a terminal, and the value of the special burst power control parameter is a value of a downlink special burst power control parameter, the receiving unit is further configured to receive the value of the downlink special burst power control parameter from the network device, and wherein the special burst controlling unit is specifically configured to, when the judgment result is that the received data is the special burst data, control the special burst data transmission power of the opposite end in accordance with the value of the downlink special burst power control parameter.

10. A system for controlling data transmission power comprising a transmitting end and a receiving end, wherein the transmitting end is configured to receive data from an opposite end; judge whether the received data is special burst data or service data thereby to generate a judgment result; control service data transmission power of the opposite end in accordance with a value of a service data power control value when the judgment result is that the received data is the service data; and control special burst data transmission power of the opposite end in accordance with a value of a special burst power control parameter when the judgment result is that the received data is the special burst data, and wherein the value of the special burst power control parameter is different from the value of the service data power control parameter, and the special burst data transmission power of the opposite end is less than the service data transmission power of the opposite end.

\* \* \* \* \*